United States Patent [19]

Grützmacher et al.

[11] Patent Number: 4,863,139
[45] Date of Patent: Sep. 5, 1989

[54] HOLDING DEVICE FOR A HOLLOW-SHAFT INCREMENTAL ENCODER OR THE LIKE

[75] Inventors: Bertold Grützmacher, Schriesheim; Walter Hofheinz, Heidelberg, both of Fed. Rep. of Germany

[73] Assignee: Heidelberger Druckmaschinen AG, Heidelberg, Fed. Rep. of Germany

[21] Appl. No.: 237,750

[22] Filed: Aug. 29, 1988

[30] Foreign Application Priority Data

Aug. 29, 1987 [DE] Fed. Rep. of Germany ....... 8711744

[51] Int. Cl.$^4$ .............................................. F16M 3/00
[52] U.S. Cl. .................................. 248/618; 248/638; 267/136
[58] Field of Search ............... 248/618, 619, 622, 630, 248/576, 638, 659, 665, 666, 667, 130, 521, 523; 267/136

[56] References Cited

U.S. PATENT DOCUMENTS

| | | | |
|---|---|---|---|
| 3,713,611 | 1/1973 | Voigt | 248/622 X |
| 4,282,566 | 8/1981 | Newman | 248/618 X |
| 4,360,184 | 11/1982 | Reid, III | 248/619 X |
| 4,405,101 | 9/1983 | Carlson et al. | 248/638 X |

FOREIGN PATENT DOCUMENTS 3310564 10/1983 Fed. Rep. of Germany .

*Primary Examiner*—Ramon O. Ramirez
*Attorney, Agent, or Firm*—Herbert L. Lerner; Laurence A. Greenberg

[57] ABSTRACT

A device for holding at least one of a rotational speed and a rotational angle encoder rigidly attached to a drive shaft includes a holding frame for the encoder, a crossbar spaced from said holding frame for fastening the holding frame to a machine, the holding frame having an upright disposition with substantially vertical side crosspieces, means for attaching substantially vertically disposed leaf springs to the side crosspieces of the holding frame, the leaf springs having respective ends connected to the crossbar, the holding frame having at least another leaf spring fastened to respective ends of the substantially vertical side crosspieces at a substantially horizontal side of the holding frame, and at least one structural element for securing the encoder within a range of section of the other leaf spring.

5 Claims, 3 Drawing Sheets

HOLDING DEVICE FOR A HOLLOW-SHAFT INCREMENTAL ENCODER OR THE LIKE

The invention relates to a holding device for receiving a rotational speed encoder and/or a rotational angle encoder, such as a hollow-shaft incremental encoder, especially, which is rigidly attached to a drive shaft. If a hollow-shaft incremental encoder is mounted directly on a shaft, the housing, which should remain immovable or in a rest position with respect to the rotating shaft, must be secured against torsion caused at the housing by the rotating shaft as a result of friction and the like.

It has become known heretofore to prevent torsion or twisting of the housing of a hollow-shaft incremental encoder by firmly securing the housing to the frame of the machine in which the drive shaft is located. For this purpose, the housing of the hollow-shaft incremental encoder is rigidly secured to the machine frame so that the forces produced by the shaft rotating in the interior of the hollow-shaft incremental encoder and acting upon the housing of the incremental encoder do not inevitably result in a twisting or torsion of the housing of the incremental encoder. Although this measure reliably prevents twisting or distortion of the incremental encoder housing, it nevertheless has a disadvantage in that, because of the rigid attachment thereof to the machine frame, any possible wobbling movement of the hollow shaft e.g. resulting from a sudden impact or jolt transversely to the longitudinal axis thereof, cannot be counteracted, which may lead to deformation and damage.

Accordingly, it is an object of the invention in the instant application to provide a device for holding a housing of a hollow-shaft incremental encoder or the like which equalizes the forces of a shaft rotating out of true or out of round.

With the foregoing and other objects in view, there is provide, in accordance with the invention, a device for holding at least one of a rotational speed and a rotational angle encoder rigidly attached to a drive shaft, the holding device comprising a holding frame for the encoder, a crossbar spaced from the holding frame for fastening the holding frame to a machine, the holding frame having an upright disposition with substantially vertical side crosspieces, means for attaching substantially vertically disposed leaf springs to the side crosspieces of the holding frame, the leaf springs having respective ends connected to the crossbar, the holding frame having at least another leaf spring fastened to respective ends of the substantially vertical side crosspieces at a substantially horizontal side of the holding frame, and means for securing the encoder within a range of action of the other leaf spring.

In accordance with another feature of the invention, the holding frame comprises the substantially vertical side crosspieces, the other leaf spring as well as a further leaf spring fastened to the respective ends of the substantially vertical side crosspieces located opposite to the ends thereof to which the other leaf spring is fastened.

In accordance with a further feature of the invention, the holding frame comprises the substantially vertical side crosspieces and a pair of mutually spaced substantially horizontal crosspieces rigidly secured at respective ends thereof to the substantially vertical side crosspieces, the other and the further leaf springs being spaced from the substantially horizontal crosspieces at the respective horizontal sides of the holding frame.

In accordance with an added feature of the invention, the encoder securing means include respective pins located at substantially diametrically opposite sides of a housing for the encoder, the pins extending through respective bores formed in the substantially horizontal crosspieces and being fastened to the respective other and further leaf springs.

In accordance with a concomitant feature of the invention, the holding frame is in combination with an encoder held thereby, and the encoder is constructed as a hollow-shaft incremental encoder.

In the foregoing device according to the invention, forces produced by a shaft cooperating with a hollow-shaft incremental encoder or the like are equalized or counterbalanced to such an extent that the forces have no effect upon the values measured by the incremental encoder. Equalizing or counterbalancing the forces produced by the shaft, in an advantageous manner prevents the incremental encoder from being damaged.

As is readily apparent, the holding device of this invention is not restricted to a hollow-shaft incremental encoder but is generally applicable to any rigidly coupled speed encoder and angle encoder, respectively, and the like.

Other features which are considered as characteristic for the invention are set forth in the appended claims.

Although the invention is illustrated and described herein as embodied in a holding device for a hollow-shaft incremental encoder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the figures of the drawing, in which.

Figure 1:
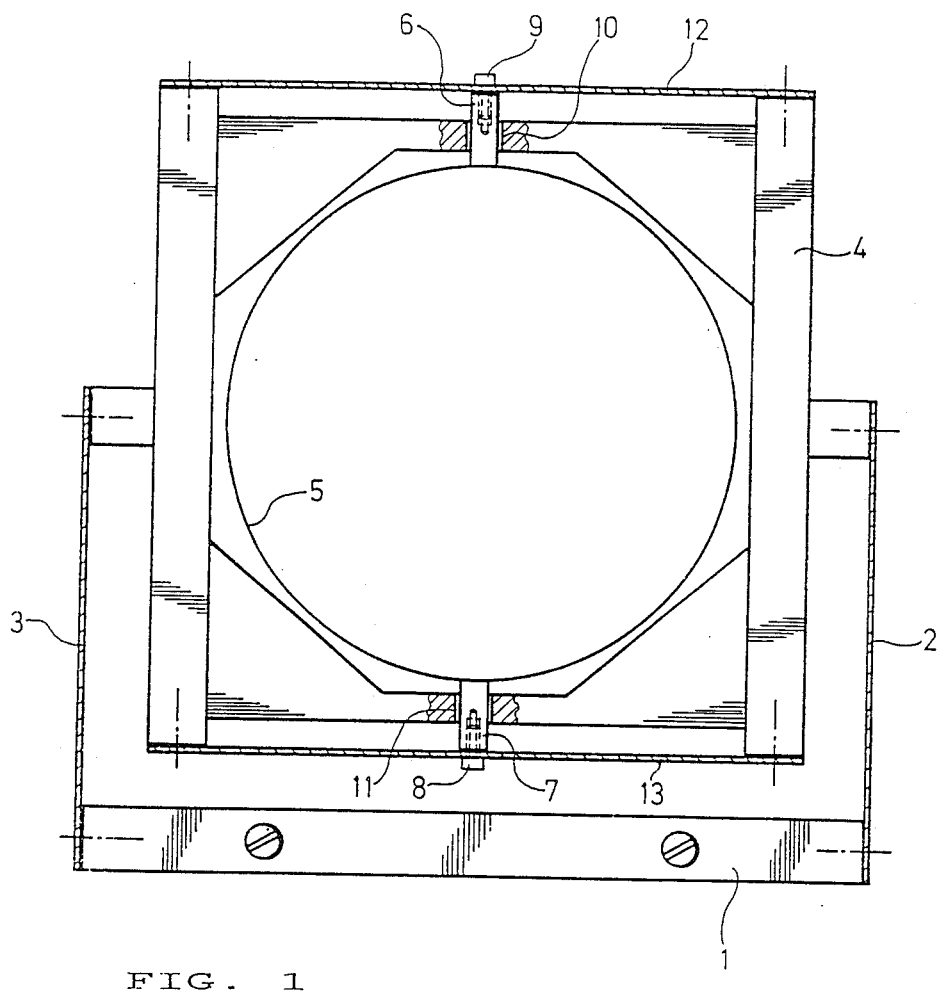
FIG. 1 is an elevational view, partly in section, of a holding device for a hollow-shaft incremental encoder constructed in accordance with the invention.

Referring now more specifically to FIG. 1 of the drawing, there is shown therein a device for holding a hollow-shaft incremental encoder which is formed of a closed frame 4 formed of two pairs of parallel crosspieces disposed perpendicularly to one another, as seen in FIG. 1, and having a shaft receiving unit, for example, a conventional hollowshaft incremental decoder in a housing 5 disposed in the interior of the frame 4. The shaft receiving unit or encoder housing 5 is formed with two pins 6 and 7 disposed opposite one another for fixing the receiving unit or decoder housing 5 at two points. The pins 6 and 7 directed radially outwardly and away from the shaft receiving unit or housing 5 extend through, with clearance, and are movably mounted in bores 10 and 11 which are formed in the frame 4. At the respective ends thereof remote from the shaft receiving unit or housing 5, the pins 6 and 7 are firmly secured to respective leaf springs 12 and 13 having, in turn, respective ends which are secured to the frame 4. Between the respective ends thereof, the leaf springs 12 and 13 are movably arranged in accordance with their function so that the leaf springs 12 and 13 can follow a motion performed in the direction of the pins 6 and 7.

Movements which are perpendicular to the motion performed in the direction of the pins 6 and 7 are absorbed by leaf springs 2 and 3 which are each rigidly attached at one end thereof to the frame 4 and, at the other end thereof, to a crossbar 1 which is, in turn, connected to the machine frame. Due to the provision of the leaf springs 2, 3, 12 and 13, it is possible for the hollow-shaft incremental encoder to adjust itself to the eccentric motion of a shaft rotating out of center, thereby preventing torsion.

Figure 2:
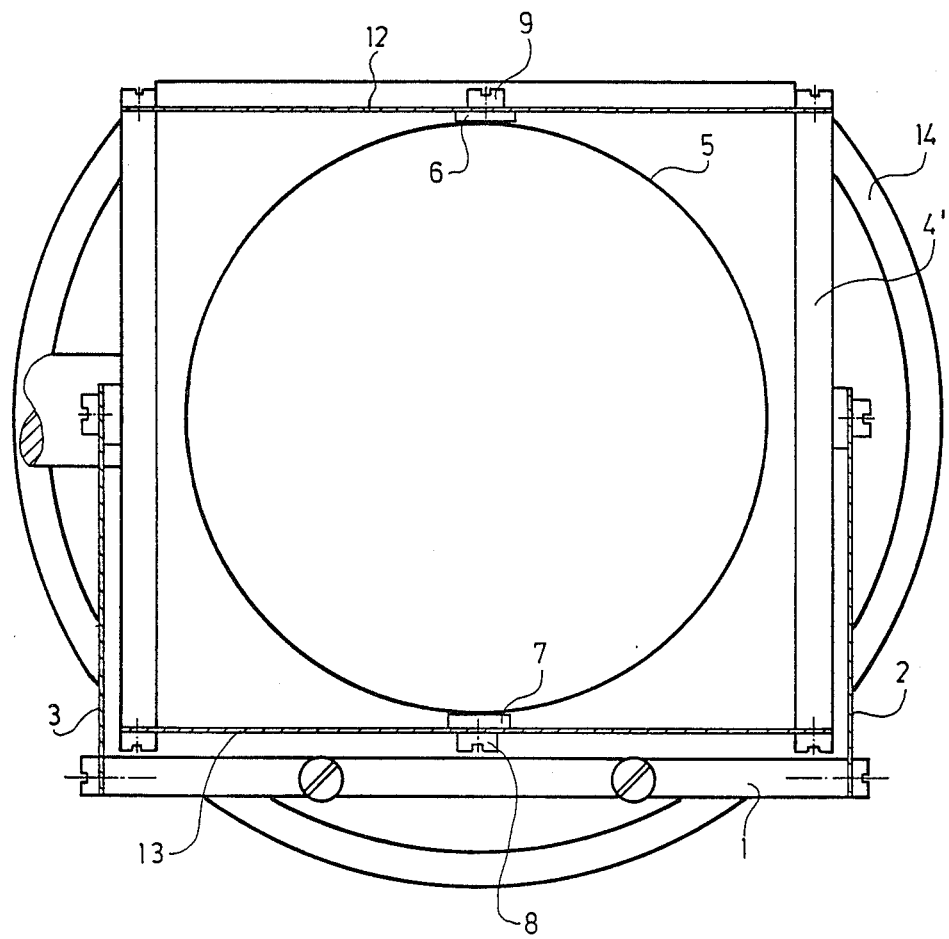
FIG. 2 is a view similar to that of FIG. 1 of another embodiment of the holding device.
Figure 3:
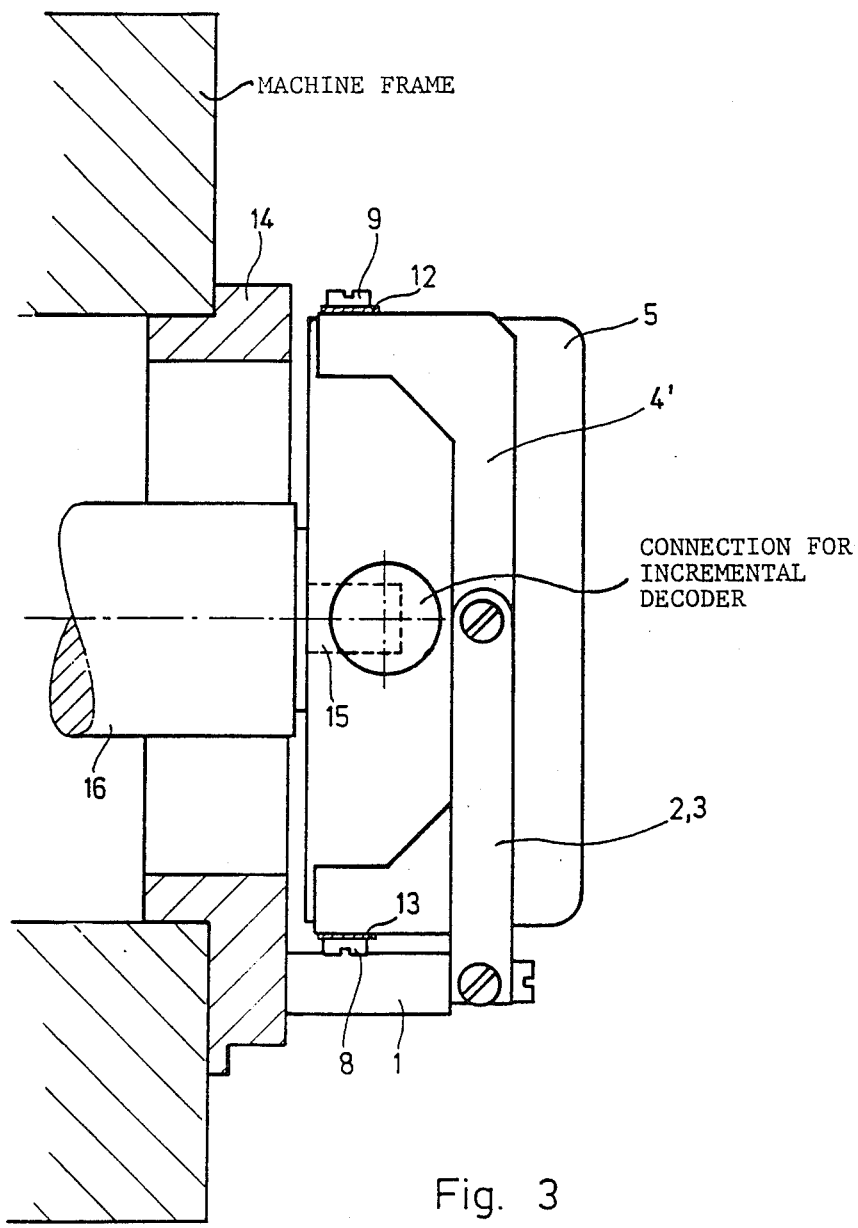
FIG. 3 is a side elevational view of FIG. 2 showing an hollow-shaft incremental encoder held by the holding device and mounted on a shaft pin of a cylinder.

In a second embodiment of the invention shown in FIGS. 2 and 3, the frame 4' is formed only by two parallel crosspieces disposed vertically in FIGS. 2 and 3 and connected at respective ends thereof with the leaf springs 12 and 13. No rigid crosspieces perpendicular to the crosspieces 12 and 13, as in the embodiment of FIG. 1, are provided in the embodiment of FIGS. 2 and 3. The diametrically opposite pins 6 and 7 in the embodiment of FIGS. 2 and 3, are considerably shorter than those of the embodiment of FIG. 1 and are firmly secured by screws 8 and 9 to a middle location of the leaf springs 12 and 13. Leaf springs 2 and 3 are secured at one end thereof by respective screws to middle locations of the rigid parallel crosspieces of the frame 4', and at the other end thereof to the cross bar 1 which is, in turn, fastened by the illustrated screws to a flange 14 which is fastened in a centered position within a bore formed in a side frame of the printing machine.

As shown in FIG. 3, the hollow-shaft incremental encoder is mounted on a shaft pin 15 extending from the end of a shaft 16 of a cylinder. A connection or terminal for the hollow-shaft incremental decoder is located at a side of the housing 5.

In FIGS. 2 and 3, there is shown another embodiment of the holding device according to the invention, wherein an incremental encoder is held while mounted on a shaft pin 15 carried by a shaft 16 of a cylinder. The crossbar 1 is suitably fastened by the illustrated screws to a flange 14 projecting from a machine frame.

We claim:

1. A device for holding at least one of a rotational speed and a rotational angle encoder rigidly attached to a drive shaft, the holding device comprising a holding frame for the encoder, a crossbar spaced from said holding frame for fastening the holding frame to a machine, said holding frame having an upright disposition with substantially vertical side crosspieces, means for attaching substantially vertically disposed leaf springs to said side crosspieces of said holding frame, said leaf springs having respective ends connected to said crossbar, said holding frame having at least another leaf spring fastened to respective ends of said substantially vertical side crosspieces at a substantially horizontal side of said holding frame, and means for securing the encoder within a range of action of said other leaf spring.

2. Holding device according to claim 1, wherein said holding frame comprises said substantially vertical side crosspieces, said other leaf spring as well as a further leaf spring fastened to the respective ends of said substantially vertical side crosspieces located opposite to the ends thereof to which said other leaf spring is fastened.

3. Holding device according to claim 2, wherein said holding frame comprises said substantially vertical side crosspieces and a pair of mutually spaced substantially horizontal crosspieces rigidly secured at respective ends thereof to said substantially vertical side crosspieces, said other and said further leaf springs being spaced from said substantially horizontal crosspieces at the respective horizontal sides of said holding frame.

4. Holding device according to claim 3, wherein said encoder securing means include respective pins located at substantially diametrically opposite sides of a housing for the encoder, said pins extending through respective bores formed in said substantially horizontal crosspieces and being fastened to the respective other and further leaf springs.

5. Holding device according to claim 1 in combination with an encoder held thereby, wherein the encoder is constructed as a hollow-shaft incremental encoder.

* * * * *